Figure 1:
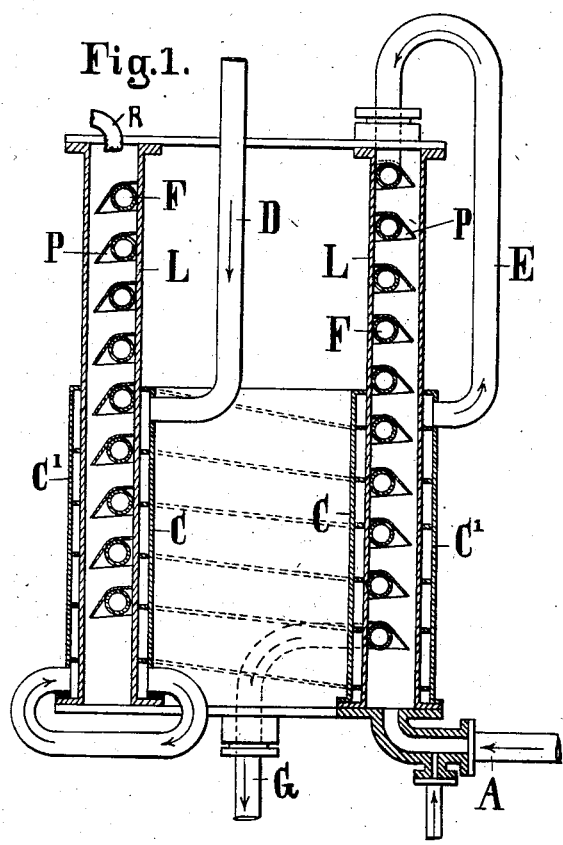

No. 729,398. PATENTED MAY 26, 1903.
A. OSENBRÜCK.
ABSORBER FOR AMMONIA ABSORPTION REFRIGERATING OR LIKE MACHINES.
APPLICATION FILED AUG. 16, 1902.

NO MODEL. 2 SHEETS—SHEET 1.

Witnesses: Inventor
August Osenbrück
By James L. Norris
Atty.

No. 729,398. PATENTED MAY 26, 1903.
A. OSENBRÜCK.
ABSORBER FOR AMMONIA ABSORPTION REFRIGERATING OR LIKE MACHINES.
APPLICATION FILED AUG. 16, 1902.
NO MODEL. 2 SHEETS—SHEET 2.
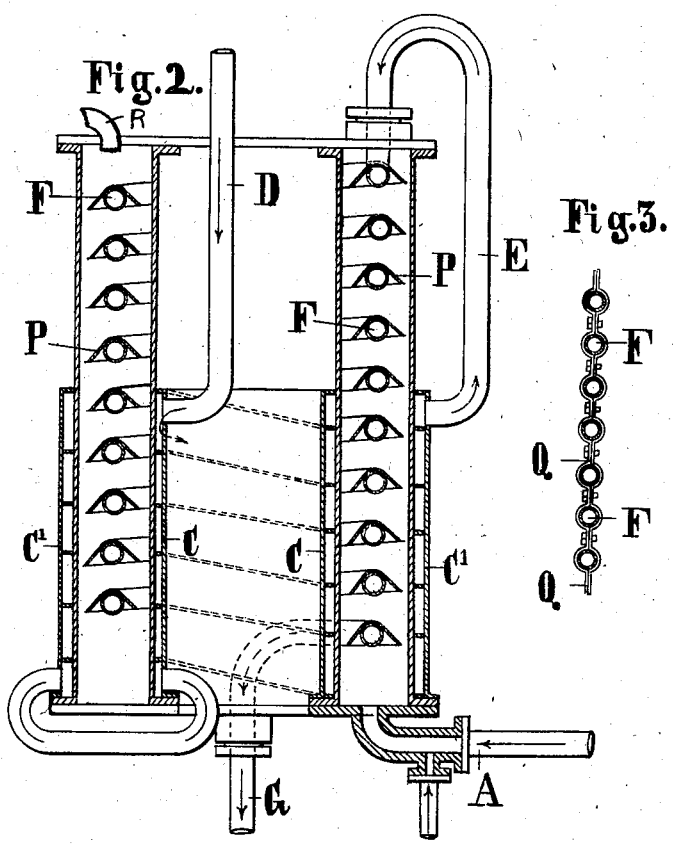

No. 729,398. Patented May 26, 1903.

UNITED STATES PATENT OFFICE.

AUGUST OSENBRÜCK, OF BREMEN, GERMANY.

ABSORBER FOR AMMONIA-ABSORPTION REFRIGERATING OR LIKE MACHINES.

SPECIFICATION forming part of Letters Patent No. 729,398, dated May 26, 1903.

Application filed August 16, 1902. Serial No. 119,887. (No model.)

*To all whom it may concern:*

Be it known that I, AUGUST OSENBRÜCK, a subject of the Emperor of Germany, residing at Bremen, Germany, have invented certain new and useful Improvements in Absorbers for Ammonia-Absorption Refrigerating or Like Machines, of which the following is a specification.

This invention relates to an improved absorber for ammonia-absorption refrigerating and like machines, and has for its object the construction of an absorber in which such highly-saturated solutions of ammonia can be made that liquid anhydrous ammonia can be driven out therefrom by exhaust-steam of 100° centigrade.

Referring to the drawings, Figure 1 represents a vertical section of my improved absorber. Fig. 2 represents a vertical section of the same, showing a modification of the arrangement of the cooling-tubes and also a modification of the spiral strips soldered to the cooling-tubes; and Fig. 3 shows a vertical section through one of the supporting-frames for the cooling-tubes when the modification shown in Fig. 2 is used.

The absorber consists of a welded wrought-iron casing, with flanges welded thereto and a cast or wrought-iron base and cover. The gaseous ammonia from the vaporizer and the exhausted ammonia solution from the distilling-boiler unite in the pipe A below the base. At its lower part the absorber is surrounded by two cooling-jackets C and C'. The cooling-water enters the top of the inner jacket C through a pipe D, is conducted downward therein by a serpentine or spiral partition, rises in the outer jacket C', being similarly guided by a serpentine partition, and passes at the top out of the outer jacket through a pipe E. Through the pipe E the cooling-water passes into the serpentine pipe F and moves downward through this, after which it leaves the absorber through a pipe G.

In the constructional form of my improved absorber shown in Fig. 1 the cooling-pipe F is soldered to an inner tinned sheet-metal casing L, and spiral strips P of sheet-metal are soldered to the outside of the said pipe, these strips widening out conically downward. This form of the cooling-tubes presents the advantage that the outer parts of the absorption liquid can everywhere come into contact unimpeded with the cooling-tubes. A suitable outlet for the ammonia solution is provided at R.

In the constructional form of the absorber shown in Fig. 2 the spiral strips P of sheet-metal are soldered both to the outside and to the inside of the cooling-tube F. Each spiral tube is provided with three or more supports, (the tube-frames Q, Fig. 3.) These frames are made of iron strip and are gripped over by the sheet-metal strips P and made fluid-tight by soldering.

What I claim is—

1. An absorber for ammonia-absorption machines, comprising an annular receptacle, an inlet and an outlet to said annular receptacle, cooling-jackets on the lower parts of the exterior of the inner and outer walls of said annular receptacle, a serpentine coil in the interior of said annular receptacle, and fluid connections uniting said jackets and said serpentine coil into a continuous series, substantially as described.

2. An absorber for ammonia-absorption machines, comprising an annular receptacle, an inlet and an outlet to said annular receptacle, jackets on the lower parts of the exterior of the inner and outer walls of said annular receptacle, a serpentine coil in the interior of said annular receptacle, a downwardly and laterally extending sheet-metal strip on said serpentine coil, and fluid connections uniting said jackets and said serpentine coil into a continuous series, substantially as described.

3. An absorber for ammonia-absorption machines, comprising an annular receptacle, an inlet and an outlet to said annular receptacle, jackets on the lower parts of the exterior of the inner and outer walls of said annular receptacle, spiral partitions in said jackets, a serpentine coil in the interior of said annular receptacle, a downwardly and laterally extending sheet-metal strip on said serpentine coil, and fluid connections uniting said jackets and said serpentine coil into a continuous series, substantially as described.

In testimony whereof I have hereunto set my hand in presence of two subscribing witnesses.

AUGUST OSENBRÜCK.

Witnesses:
L. OTTEN,
I. MECKE.